(12) United States Patent
Houpt et al.

(10) Patent No.: US 6,960,276 B2
(45) Date of Patent: Nov. 1, 2005

(54) FRANGIBLE FIBERGLASS INSULATION BATTS

(75) Inventors: Ronald A. Houpt, Shelbyville, IN (US); Carl J. Kissell, Shelbyville, IN (US); Cameron J. Wright, Naperville, IN (US); Jon W. Pereira, Shelbyville, IN (US)

(73) Assignee: Knauf Fiber Glass GmbH, Shelbyville, IN (US)

( * ) Notice: Subject to any disclaimer, the term of this patent is extended or adjusted under 35 U.S.C. 154(b) by 0 days.

(21) Appl. No.: 10/671,923

(22) Filed: Sep. 25, 2003

(65) Prior Publication Data

US 2005/0067092 A1 Mar. 31, 2005

(51) Int. Cl.[7] ............................................. B32B 31/00
(52) U.S. Cl. ..................... 156/259; 156/260; 156/264; 156/271; 156/304.1; 156/512; 156/517; 156/529; 156/546; 52/98
(58) Field of Search ............................... 156/271, 259, 156/268, 264, 257, 512, 529, 517, 546, 304.6, 156/277, 304.1; 52/98, 309.6, 309.3, 309.15, 52/309.4, 404.1, 309.5, 404.4; 428/43, 54, 428/55, 57, 58, 68, 74, 426; 442/180

(56) References Cited

U.S. PATENT DOCUMENTS

| | | | |
|---|---|---|---|
| 1,238,356 A | | 8/1917 | Stokes |
| 3,070,475 A | * | 12/1962 | Carlson ..................... 156/297 |
| 3,230,995 A | * | 1/1966 | Shannon ..................... 156/166 |
| 3,493,452 A | * | 2/1970 | Cole .......................... 156/254 |
| 3,546,846 A | * | 12/1970 | Sens ........................... 53/433 |
| 3,955,031 A | * | 5/1976 | Jones et al. .................. 442/412 |
| 4,342,610 A | | 8/1982 | Ray, Jr. |
| 4,362,585 A | * | 12/1982 | de Antonis et al. ......... 156/62.2 |
| 4,552,793 A | * | 11/1985 | Cameron et al. ............. 428/53 |
| 4,700,521 A | | 10/1987 | Cover |
| 4,772,499 A | | 9/1988 | Greenway |
| 5,240,527 A | * | 8/1993 | Lostak et al. .............. 156/62.4 |
| 5,350,663 A | | 9/1994 | Blum et al. |
| 5,765,318 A | | 6/1998 | Michelsen |
| 5,900,298 A | * | 5/1999 | Syme et al. .................. 428/68 |
| 5,981,037 A | | 11/1999 | Patel et al. |
| 6,083,594 A | | 7/2000 | Weinstein et al. |
| 6,165,305 A | | 12/2000 | Weinstein et al. |
| 6,191,057 B1 | * | 2/2001 | Patel et al. .................. 442/398 |
| 6,357,504 B1 | * | 3/2002 | Patel et al. .................. 156/499 |
| 6,383,594 B2 | | 5/2002 | Weinstein et al. |
| 6,399,694 B1 | | 6/2002 | McGrath et al. |
| 6,484,463 B1 | | 11/2002 | Fay |
| 6,670,011 B2 | * | 12/2003 | Weinstein et al. ............ 428/43 |

* cited by examiner

Primary Examiner—Linda Gray
(74) Attorney, Agent, or Firm—Barnes & Thornburg LLP

(57) ABSTRACT

A frangible fiberglass insulation batt includes a pair of fiberglass strips arranged to lie in side-by-side relation to one another and a frangible adhesive bridge spanning a gap between the fiberglass strips and retaining the fiberglass strips in side-by-side relation. To produce such a batt, a fiberglass insulation blanket is cut along its length to form two side-by-side fiberglass strips and then an adhesive material is applied to form a frangible adhesive bridge between the strips.

24 Claims, 2 Drawing Sheets

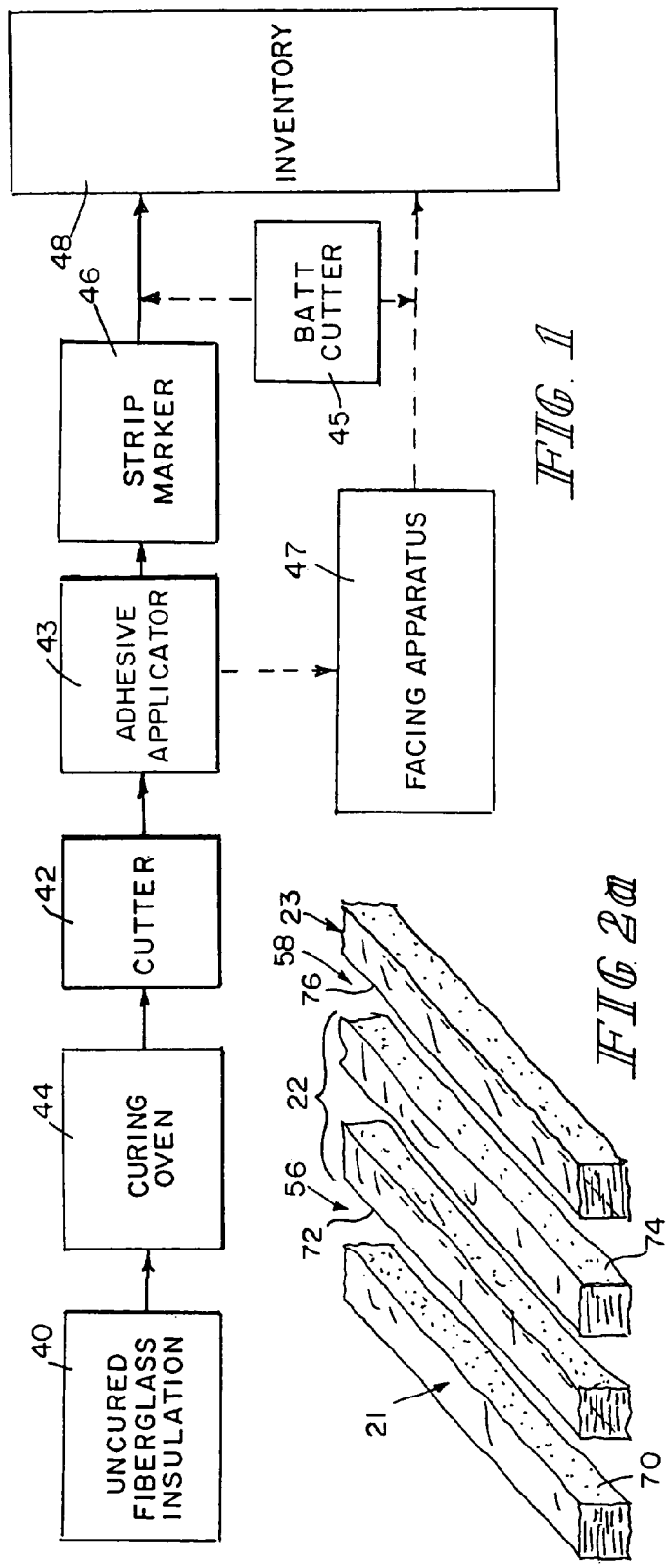
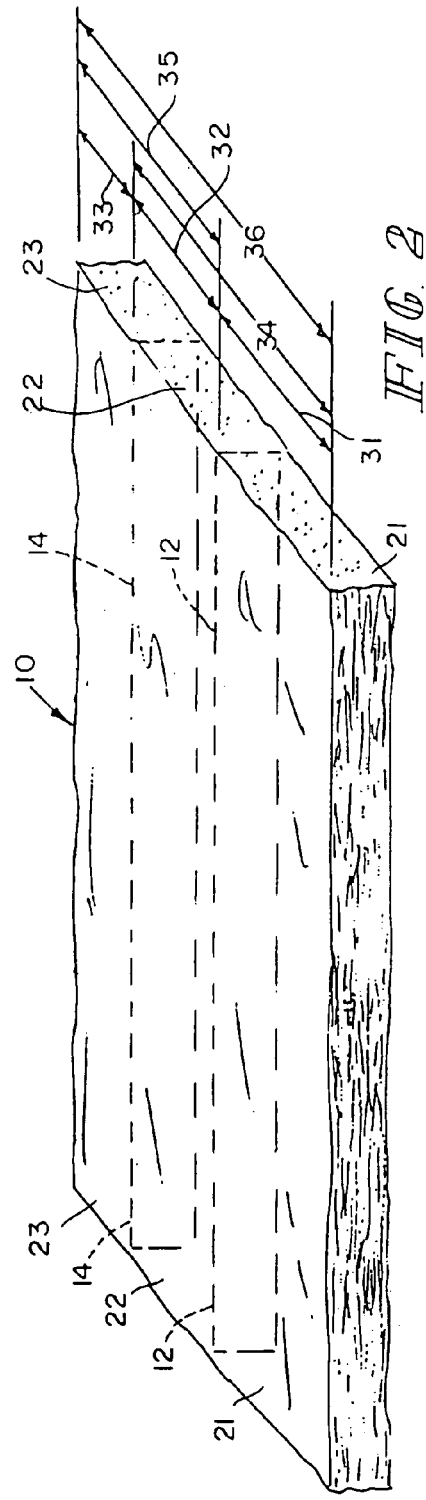

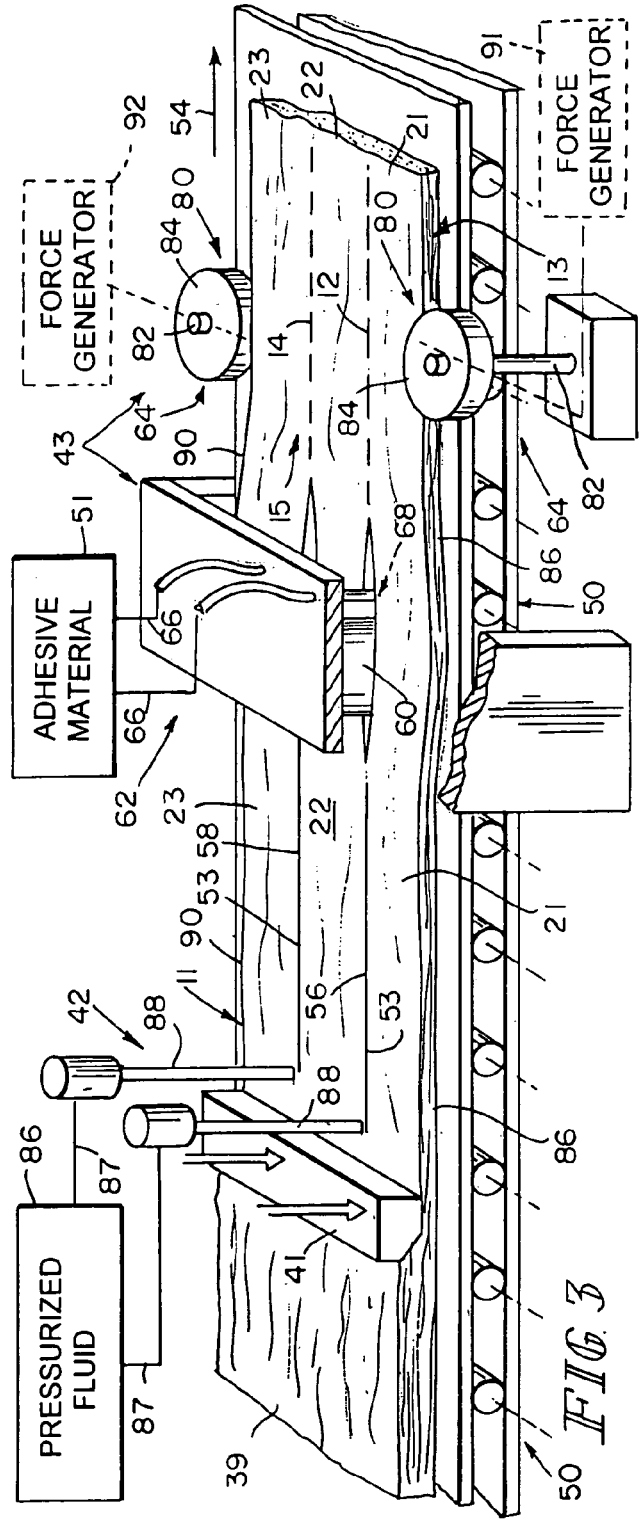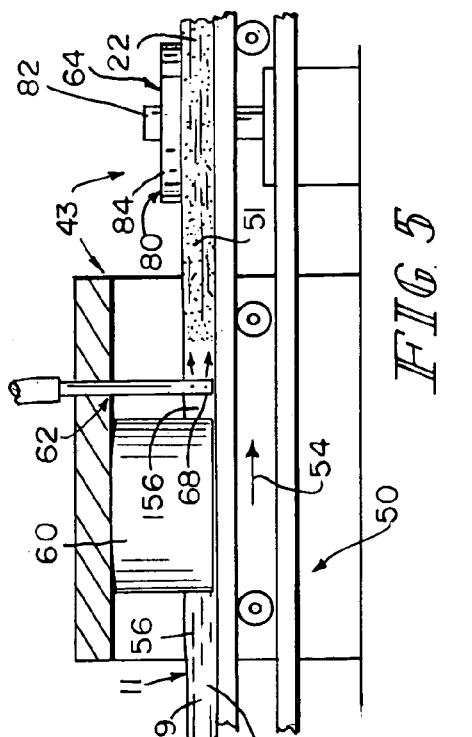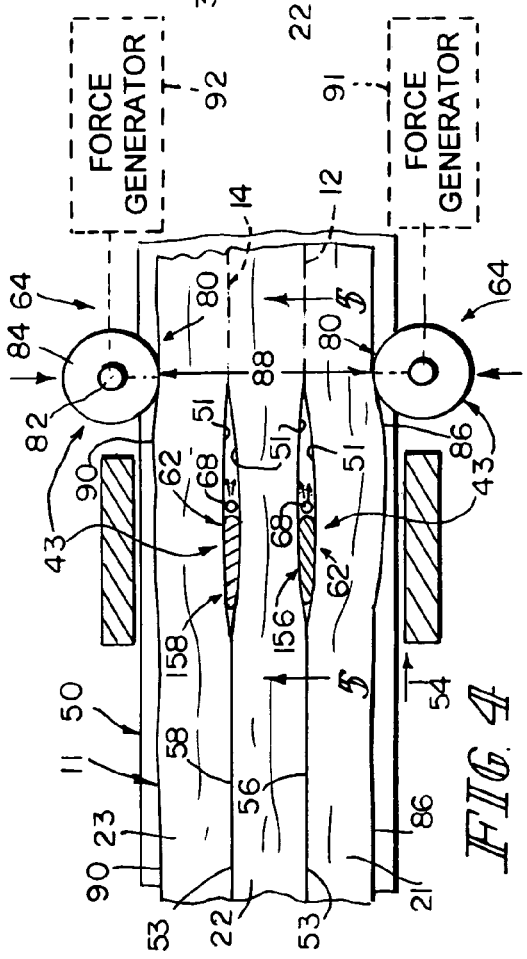

FRANGIBLE FIBERGLASS INSULATION BATTS

BACKGROUND AND SUMMARY

The present disclosure relates to apparatus and methods for producing fiberglass insulation batts, and in particular, batts of fiberglass insulation suitable for use in building construction. More particularly, the present disclosure relates to fiberglass insulation batts that are configured to be converted into separate fiberglass insulation strips of various predetermined widths in the field without the use of cutting tools.

Fiberglass insulation is made of glass fibers held together by a binder. Glass fibers are produced by melting sand or recycled glass products and spinning those materials to produce tiny strands of fiberglass. Glass fibers will not stick together unless they are glued or bound together. A binder is an adhesive material that holds fibers together, allowing them to keep their shape or overall form. Fiberglass insulation is made, for example, by spraying a binder on the glass fibers. After being cured in an oven, the binder holds the fibers together.

A batt is a blanket of fiberglass insulation used to insulate residential and commercial buildings. Some batts include a paper or foil facing material affixed to the fiberglass insulation, and other batts do not include any facing material.

According to the present disclosure, a frangible fiberglass insulation batt includes a pair of fiberglass strips arranged to lie in side-by-side relation to one another and a frangible adhesive bridge spanning a gap between the fiberglass strips and retaining the fiberglass strips in side-by-side relation. In the field at a construction site, a worker can separate one of the fiberglass strips from the other of the strips by pulling one strip laterally away from the other strip using a "peeling away" action owing to relatively weak internal bonds in the frangible adhesive bridge. No tools are needed to accomplish such separation of the two fiberglass strips.

A method of producing such a frangible fiberglass insulation batt comprises the steps of passing a stream of cured fiberglass insulation through a cutter to form two side-by-side fiberglass strips and then passing the two side-by-side strips through an adhesive applicator. The adhesive applicator applies an adhesive material to one or both of the strips and the strips are mated to establish the frangible adhesive bridge between the strips. This frangible adhesive bridge spans the gap and retains the two fiberglass strips in fixed relation to one another until the frangible adhesive bridge is, for example, torn along its length or otherwise fractured by a construction worker in the field.

In an illustrative embodiment, the adhesive applicator includes a strip separator, an adhesive dispenser, and a strip joiner. The strip separator intercepts and deflects the moving fiberglass insulation after it exits the cutter to separate the two side-by-side strips along a cut line therebetween to expose opposing side edges of the strips and provide a widened gap between the strips. The adhesive dispenser is located in or near the widened gap between the strips and configured to dispense an adhesive material onto one or both of the opposing side edges of the strips. The strip joiner is configured to manipulate one or more of the strips to mate the opposing edges of the strips so that adhesive material deposited therebetween bonds with the fiberglass strips to establish the frangible adhesive bridge between the fiberglass strips. Internal bonds of the frangible adhesive bridge are relatively weak in comparison to internal bonds of the fiberglass strips and are broken easily by a worker in the field to facilitate separation of one strip from the other strip without the use of tools.

Additional features of the present disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a diagrammatic view of a method in accordance with the present disclosure for producing a frangible fiberglass insulation batt (that can be separated by hand into strips having predetermined widths) by curing uncured fiberglass insulation in a "curing oven", cutting that fiberglass insulation in a "cutter" to form separate yet adjacent insulation strips and a gap between the strips, applying an adhesive material to the separated strips to cause the strips to bond together to establish a frangible adhesive bridge spanning the gap between the strips, and then sing either a "strip marker" or "facing apparatus" to indicate the location of the frangible adhesive bridges in the fiberglass insulation;

FIG. 2 is a perspective view of a frangible fiberglass insulation batt formed to include two frangible adhesive bridges extending along the length of the batt so that the batt can be "broken" manually along the two frangible adhesive bridges to produce three separate insulation strips without the use of cutting tools;

FIG. 2a shows a fiberglass diagrammatic view of the three strips shown in FIG. 2 and the gaps between those three strips after separation of the strips;

FIG. 3 is a perspective view of a system for producing a fiberglass insulation batt, which system uses a conveyor to move cured fiberglass insulation so that the fiberglass insulation is intercepted by, in sequence, a cutter, a strip separator, an adhesive dispenser, and a strip joiner and showing a first embodiment (in solid) wherein the strip joiner comprises a pair of spaced-apart barriers (each barrier comprising, e.g., a rotating wheel) and a second embodiment (in phantom) wherein the strip joiner comprises a "force generator" that functions to apply a pneumatic or other force (using, e.g., compressed air) to move one or more insulation strips toward another insulation strip;

FIG. 4 is a top plan view of the system shown in FIG. 3 showing a first strip separator and first adhesive dispenser in a widened gap formed between first and second insulation strips and showing a second strip separator and second adhesive dispenser in a widened gap formed between second and third insulation strips; and FIG. 5 is a side elevation view taken along line 5—5 of FIG. 4.

DETAILED DESCRIPTION

Apparatus and methods are disclosed herein for producing a fiberglass insulation batt that is formed to include longitudinally extending frangible planes therein to enable construction workers to convert the fiberglass insulation batt into separate fiberglass insulation strips of various predetermined widths in the field without the use of cutting tools. A "batt" is a blanket of thermal insulation usually comprising glass fibers.

Relatively weak internal bonds are established using an adhesive material during manufacture of the fiberglass insulation batt to define the longitudinally extending frangible planes using apparatus and methods described herein. These internal bonds are strong enough to hold the fiberglass insulation batt "together in one piece" during transport from inventory to a construction site and yet are weak enough to allow a construction worker to separate one longitudinally extending strip in the batt from an adjacent longitudinally extending strip in the batt manually and without the use of cutting tools.

Various methods are suggested diagrammatically in FIG. 1 for producing a frangible fiberglass insulation batt 10 shown, for example, in FIG. 2. Batt 10 is formed using apparatus and methods disclosed herein to include two longitudinally extending frangible adhesive bridges 12, 14 which are arranged to lie in spaced-apart parallel relation to one another to "partition" batt 10 into three formative longitudinally extending strips 21, 22, and 23.

In the field at a construction site, a worker can separate first strip 21 from second strip 22 along first frangible adhesive bridge 14 by pulling one strip laterally away from the other strip using a "peeling-away" or other fracturing action owing to relatively weak internal bonds established along first frangible adhesive bridge 12 between fiberglass material comprising first and second strips 21, 22. Likewise, a worker can separate third strip 23 from second strip 22 along second frangible adhesive bridge 14 by pulling one of those strips away from the other of those strips in a similar manner owing to relatively weak internal bonds established along second frangible adhesive bridge 14 between fiberglass material comprising second and third strips 22, 23. Because, in an illustrative embodiment, each frangible adhesive bridge 12, 14 contains only an insubstantial amount of glass fibers, it is readily or easily broken (i.e., frangible) in response to manual "tearing" or "peeling" forces applied by a construction worker in the field so that the worker can separate one strip from its side-by-side companion strip manually without the use of cutting tools.

During building construction activities, workers often need to create insulation strips of non-conventional width and the ability to create a variety of strip widths without using cutting tools by use of frangible fiberglass insulation batt 10 would be welcomed by many workers in the construction trade. As suggested in FIG. 2, first strip 21 has a width 31, second strip 22 has a width 32, and third strip 23 has a width 33. When bonded together during manufacture, first and second strips 21, 22 have a combined width 34, second and third strips 22, 23 have a combined width 35, and first, second, and third strips 21, 22, and 23 have a combined width 36. By selecting the location of frangible adhesive bridges 12, 14 carefully during manufacture, it is possible to create a unified but frangible fiberglass insulation batt that can be separated in the field to produce a wide variety of insulation strip widths without using cutting tools.

Using a first method illustrated diagrammatically in FIG. 1, a stream of uncured fiberglass insulation 40 is passed through a curing oven 44 to cause the binder associated with the fiberglass to polymerize during exposure to fiberglass curing heat (at a temperature of about 350° F. to 600° F.) to produce a fiberglass insulation blanket 11. Uncured fiberglass insulation 40 comprises glass fibers coated with a binder. The binder "sets" when exposed to high temperature in a curing oven 44 to bind the glass fibers together. A fiberglass insulation blanket 11 is discharged from curing oven 44 and transported along a conveyor 50 in a downstream direction 54 past, in series, a cutter 42 and an adhesive applicator 43 as suggested, for example, in FIGS. 1 and 3.

Fiberglass insulation blanket 11 is passed through a cutter 42 to cut the uncured fiberglass insulation 40 into two or more separate strips. Cutter 42 cuts all the way through uncured fiberglass insulation 40 along cut lines 53 as the insulation 40 passes through cutter 42 to provide first, second, and third strips 21, 22, and 23 separated by longitudinally extending gaps 56 and 58.

Next, an adhesive applicator 43 is used to apply an adhesive material 51 to contact the strips along a cut line 53 therebetween established by cutter 42 and to join the strips together to cause the adhesive material to establish a frangible adhesive bridge spanning a gap between the strips. To "span" gap 56 or 58 is to extend across the gap and interconnect the strips defining the gap without necessarily filling or entering the gap. Adhesive material 51 can flow into the gap continuously, periodically, or intermittently to establish a suitable frangible adhesive bridge between the strips. Before batt 10 is delivered to inventory 48, it is passed through a strip marker 46 that operates to apply one or more "indicator lines" to an exterior surface of batt 10 to mark the location of each longitudinally extending frangible adhesive bridge in batt 10.

Using a method illustrated diagrammatically in FIG. 3, cured fiberglass insulation 39 is passed through a strip press 41 to compress fiberglass insulation 39 to a compacted thickness before such fiberglass insulation 39 is passed through cutter 42. In the illustration embodiment, cutter 42 comprises a pressurized fluid source 86 for supplying high-pressure fluid through fluid transfer conduits 87 to fluid-jet nozzles 88 to generate streams of fluid that pass through fiberglass insulation 39 to create longitudinally extending gaps (or cut lines) 56, 58. Strip press 41 is positioned to lie upstream of fluid-jet nozzles 88 to compress fiberglass insulation 39 to a compacted thickness selected to facilitate "cutting" fiberglass insulation using fluid-jet nozzles 88. It is within the scope of this disclosure to use saw blades (not shown) or other knife means to cut blanket 11 to form gaps 56, 58.

Using a method illustrated diagrammatically in FIG. 1, a facing apparatus 47 is used to apply a facing material (pre-marked with indicator lines) to one surface of the cut fiberglass insulation blanket 11 to align the indicator lines with the frangible adhesive bridges formed in the fiberglass insulation blanket 11. Alternatively, adhesive material 51 could have a color different from the color of strips 21, 22, 23 to provide suitable, visible indicator lines for gaps 56, 58.

As suggested in FIG. 1, a batt cutter 45 is provided downstream of strip marker 46 or facing apparatus 47. Batt cutter 45 is configured to cut periodically the strips 21, 22, 23 and frangible adhesive bridges 12, 14 laterally to provide a series of separate elongated frangible fiberglass insulation batts (not shown) for delivery to inventory 48.

Adhesive applicator 43 comprises a strip separator 60, an adhesive dispenser 62, and a strip joiner 64 arranged in series as suggested, for example, in FIGS. 3–5. In the illustrated embodiment, adhesive dispenser 62 comprises a source of adhesive material 51 for supplying adhesive material through transfer conduits 66 to discharge nozzles 68 to generate streams of adhesive material 51 that are discharged into the gap formed between a pair of side-by-side insulation strips.

As suggested in FIGS. 3–5, fiberglass insulation blanket 11 is passed through cutter 42 to cut blanket 11 along a first cut line 53 to form two side-by-side separate strips 21, 22 separated by a gap 56 and along a second cut line 53 to form a third strip 23 separated from second strip 22 by a gap 58. As suggested in FIG. 2a, first strip 21 includes a longitudinally extending side edge 70 that cooperates with an opposing longitudinally extending side edge 72 of second strip 22 to form gap 56 therebetween. Likewise, second strip 72 includes another longitudinally extending side edge 74 that cooperates with an opposing longitudinally extending side edge 76 of third strip 23 to form gap 58 therebetween. The width of the gaps 56, 58 shown in FIG. 2a is exaggerated for clarity and it is within the scope of this disclosure to vary the width of gaps 56, 58 to accommodate a suitable adhesive material to be deposited therein.

Adhesive material 51 is applied to one or both of side edges 70, 72 and one or both of side edges 74, 76 by adhesive dispenser 62. In the illustrated embodiment, strip separators 60 are arranged to lie downstream of cutter 42 and configured to separate first strip 21 from second strip 22 at cut line 53 and to separate second strip 22 from third strip 23 at cut line 53 to establish widened gaps 156, 158. Each strip separator 60 is arranged to intercept blanket 11 at one of cut lines 53 and is shaped to spread the strips apart so that they move away from one another as blanket 11 moves on conveyor 50 in downstream direction 54. Although strip separator 60 is shoe-shaped in the illustrated embodiment, a rod or other deflector having a lateral dimension wider than gaps 56, 58 could be used to separate adjacent insulation strips.

In the illustrated embodiment, adhesive material 51 is dispensed into widened gaps 156, 158 to contact at least one of side edges 70, 72 and at least one of side edges 74, 76. As suggested in FIGS. 4 and 5, discharge nozzle 68 is located in widened gap 156 and operated to discharge adhesive material 51 onto at least one of side edge 70 of first strip 21 and side edge 72 of second strip 22. The other discharge nozzle 68 is located in widened gap 158. It is within the scope of this disclosure to locate the discharge nozzles 68 near to the widened gaps 156, 158 so that adhesive material 51 can be discharged to contact the strips in a desired manner.

In a first embodiment, strip joiner 64 includes two barriers 80 that are spaced apart from one another to define a channel 15 therebetween as suggested in FIGS. 3 and 4. A downstream portion 13 of fiberglass insulation blanket 11 (having a width that is wider than the width of channel 15) is transported on conveyor 52 through the channel to compress blanket 11 to cause (1) first and second strips 21, 22 to move toward one another to trap adhesive material 51 introduced into widened gap 156 to establish frangible adhesive bridge 12 and (2) second and third strips 22, 23 to move toward one another to trap adhesive material 51 introduced into widened gap 158 to establish frangible adhesive bridge 14.

In one embodiment, each barrier 80 includes an upright axle 82 and an edge roller 84 mounted for rotation on upright axle 82 to engage an exterior edge 86 or 90 of fiberglass insulation blanket 11 as blanket 11 moves along conveyor 50. Illustratively, barriers 80 are anchored in a fixed position relative to one another and to moving blanket 11 to cause the distance 88 between barriers 80 to be fixed and less than the width of the portion of blanket 11 entering channel 15 defined by barriers 80.

In another embodiment, strip joiner 64 is provided by force generators 91, 92 as suggested in FIGS. 3 and 4. It is within the scope of this disclosure to use a first force generator 91 to discharge a first stream (continuous or pulsed flow) of pressurized gas (e.g. air) to impact first exterior edge 86 of fiberglass insulation blanket 11 and to use a second force generator 92 to discharge a second stream of pressurized gas to impact a second exterior edge 90 of fiberglass insulation blanket 11. It is within the scope of this disclosure to use one force generator to produce both of the first and second streams of pressurized gas. The forces applied to first exterior edge 86 and to second exterior edge 90 cooperate to compress blanket 11 laterally to mate strips 21, 22, and 23 to trap the adhesive material 51 deposited there between to form frangible adhesive bridges 56, 58.

What is claimed is:

1. A method of producing a frangible fiberglass insulation batt, the method comprising the steps of
    passing a fiberglass insulation blanket having a major surface defining a width of the fiberglass insulation blanket and a lateral surface defining a thickness of the fiberglass insulation blanket that is less than the width through a cutter to cut the fiberglass insulation blanket along a cut line to produce a cut that extends perpendicular to the major surface of the fiberglass insulation blanket to form two side-by-side separate strips separated by a gap, a first of the strips having a longitudinally extending side edge extending along the cut line, a second of the strips having a longitudinally extending side edge extending along the cut line and opposing the longitudinally extending side edge of the first of the strips to define the gap,
    applying an adhesive material to at least one of the opposing longitudinally extending side edges, and
    joining the opposing longitudinally extending side edges together to cause the adhesive material to establish a frangible adhesive bridge spanning the gap between the opposing longitudinally extending side edges and establishing relatively weak internal bonds between the opposing longitudinally extending side edges of the two side-by-side strips to produce a frangible fiberglass insulation batt.

2. The method of claim 1, wherein the applying step includes the steps of separating the first of the strips from the second of the strips along the cut line to establish a widened gap therebetween bounded by the opposing longitudinally extending side edges and dispensing the adhesive material into that widened gap to contact at least one of the opposing longitudinally extending side edges.

3. The method of claim 2, wherein the dispensing steps includes the steps of locating a discharge nozzle in the widened gap and operating the discharge nozzle to discharge the adhesive material onto at least one of the opposing longitudinally extending side edges.

4. The method of claim 3, wherein the passing step includes the step of moving the fiberglass insulation blanket on a conveyor underlying the fiberglass insulation blanket and the separating step includes the step of locating a strip separator in a downstream position relative to the cutter to intercept the fiberglass insulation blanket at the cut line as the fiberglass insulation blanket moves on the conveyor in a downstream direction.

5. The method of claim 1, wherein the applying step includes the step of moving the longitudinally extending side edge of the first of the strips away from the longitudinally extending side edge of the second of the strips to establish a widened gap therebetween and introducing adhesive material into the widened gap to contact at least one of the opposing longitudinally extending side edges.

6. The method of claim 5, wherein the joining step includes the step of transporting a downstream portion of the fiberglass insulation blanket comprising the two side-by-side separate strips through a channel defined by two spaced-apart barriers to compress the fiberglass insulation blanket to cause the first and second of the strips to move toward one another to trap adhesive material introduced into the widened gap between the opposing longitudinally extending side edges to establish the frangible adhesive bridge.

7. The method of claim 6, wherein each spaced-apart barrier includes an upright axle and an edge roller mounted for rotation on the upright axle and arranged to engage an exterior edge of the fiberglass insulation blanket.

8. The method of claim 5, wherein the joining step includes the step of discharging a first stream of pressurized gas to impact a first exterior edge of the fiberglass insulation blanket and a second stream of pressurized gas to impact a second exterior edge of the fiberglass insulation blanket to cause the first and the second of the strips to move toward one another to trap the adhesive material introduced into the widened gap between the opposing longitudinally extending side edges to establish the frangible adhesive bridge.

9. The method of claim 1, wherein the joining step includes the step of discharging a first stream of pressurized gas to impact a first exterior edge of the fiberglass insulation blanket and a second stream of pressurized gas to impact a second exterior edge of the fiberglass insulation blanket to cause the first and the second of the strips to move toward one another to trap the adhesive material introduced into the widened gap between the opposing longitudinally extending side edges to establish the frangible adhesive bridge.

10. The method of claim 1, wherein the joining step includes the step of transporting a downstream portion of the fiberglass insulation blanket comprising the two side-by-side separate strips through a channel defined by two spaced-apart barriers to compress the fiberglass insulation blanket to cause the first and second of the strips to move toward one another between the opposing longitudinally extending side edges to establish the frangible adhesive bridge.

11. A method of producing a frangible fiberglass insulation batt, the method of comprising the steps of
passing a stream of fiberglass insulation having a major surface defining a width of the fiberglass insulation blanket and a lateral surface defining a thickness of the fiberglass insulation blanket that is less than the width through a cutter to cut the insulation substantially perpendicular to the major surface and to form two side-by-side fiberglass strips, each said strip having a longitudinally extending side edge, separated by a gap, and
moving the two side-by-side fiberglass strips through an adhesive applicator to apply adhesive to at least one of the edges to establish a frangible adhesive bridge spanning the gap between the two side-by-side fiberglass strips and establishing relatively weak internal bonds between the opposing longitudinally extending side edges of the two side-by-side strips to retain the two side-by-side fiberglass strips in fixed relation to one another.

12. The method of claim 11, wherein the dispensing step includes the steps of locating a discharge nozzle to communicate with the longitudinally extending side edges and using the discharge nozzle to discharge an adhesive material onto at least one of the longitudinally extending side edges.

13. The method of claim 12, wherein the moving step includes the step of compressing a downstream portion of the fiberglass insulation blanket located in a downstream position relative to the discharge nozzle to cause the two strips to move toward one another to trap adhesive material discharged onto at least one of the longitudinally extending side edges between the two strips to establish the frangible adhesive bridge.

14. The method of claim 13, wherein the compressing step includes the step of applying a first stream of pressurized gas to a first longitudinally extending exterior side edge of the downstream portion of the fiberglass insulation blanket to move a first of the fiberglass strips in a first direction toward a second of the fiberglass strips and applying a second stream of pressurized gas to a second longitudinally extending side edge of the downstream portion of the fiberglass insulation blanket to move the second of the fiberglass strips in a second direction toward the first of the fiberglass strips.

15. The method of claim 13, wherein the moving step further includes the step of transporting a downstream portion of the fiberglass insulation blanket located in a downstream position relative to the discharge nozzle through a channel defined by two spaced-apart barriers to trap adhesive material discharged onto at least one of the longitudinally extending side edges between the two strips to establish the frangible adhesive bridge.

16. The method of claim 15, wherein each spaced-apart barrier includes an upright axle and an edge roller mounted for rotation on the axle and arranged to engage an exterior edge of the downstream portion of the fiberglass insulation blanket.

17. The method of claim 11, wherein the moving step further includes the step of using a strip separator located along the cut line to move the two fiberglass strips apart from one another to widen the gap formed between the two fiberglass strips upon movement of the fiberglass insulation blanket on a conveyor in a downstream direction relative to the strip separator and wherein the applying step is carried out after the widening step to cause the adhesive material to be dispensed into the gap after the gap has been widened during the widening step.

18. The method of claim 17, wherein the applying step includes the steps of locating a discharge nozzle in the gap widened during the widening step and operating the discharge nozzle to discharge the adhesive material onto at least one of the two strips.

19. The method of claim 11, wherein the moving step further includes the step of compressing a downstream portion of the fiberglass insulation blanket comprising the two side-by-side fiberglass strips to cause the two fiberglass strips to move toward one another to trap adhesive material dispensed into the gap formed between the two fiberglass strips to establish the frangible adhesive bridge.

20. The method of claim 19, wherein the compressing step includes the step of applying a first stream of pressurized gas to a first exterior side edge of the fiberglass insulation blanket to move a first of the fiberglass strips in a first direction and applying a second stream of pressurized gas to a second exterior side edge of the fiberglass insulation blanket to move the second of the fiberglass strips in a second direction toward the first of the fiberglass strips.

21. The method of claim 19, wherein the compressing step includes the step of transporting the downstream portion of the fiberglass insulation blanket through a channel defined by two spaced-apart barriers to trap adhesive material dispensed into the gap formed between the two fiberglass strips to establish the frangible adhesive bridge.

22. A method of producing a frangible fiberglass insulation batt, the method comprising, in series, the steps of
passing a fiberglass insulation blanket having a major surface defining a width of the fiberglass insulation blanket and a lateral surface defining a thickness of the fiberglass insultion blanket that is less than the width through a cutter to cut the fiberglass insulation blanket along a cut line substantially perpendicular to the major surface to form two side-by-side fiberglass strips each said strip having a longitudinally extending side edge separated by a gap, urging a first of the fiberglass strips to move away from a second of the fiberglass strips to widen a gap formed along the cut line between the two side-by-side fiberglass strips, discharging an adhesive material into the gap widened during the urging step to contact the side edge of at least one of the two side-by-side fiberglass strips, and urging the fiberglass strips to move toward one another to trap the adhesive material therebetween to establish a frangible adhesive bridge interconnecting the side edges of the fiberglass strips and establishing relatively weak internal bonds between the opposing longitudinally extending side edges of the two side-by-side strips.

23. A method of producing a frangible fiberglass insulation batt, the method comprising the steps of providing a first cutter and a second cutter positioned to lie in laterally spaced-apart relation to the first cutter, passing a fiberglass insulation blanket through the first and second cutters to cut the fiberglass insulation blanket along a first cut line to form side-by-side first and second strips separated by a first gap and along a second cut line to form a third strip separated from the second strip by a second gap, the first strip including a longitudinally extending side edge cooperating with an opposing longitudinally extending first side edge of the second strip to form the first gap therebetween, the second strip including a longitudinally extending second side edge cooperating with an opposing longitudinally extending side edge of the third strip to form the second gap therebetween, applying an adhesive material to at least one of the longitudinally extending side edge of the first strip and the longitudinally extending first side edge of the second strip in the first gap, applying an adhesive material to at least one of the longitudinally extending second side edge of the second strip and the longitudinally extending side edge of the third strip in the second gap, joining the longitudinally extending side edge of the first strip and the longitudinally extending first side edge of the second strip together to cause the adhesive material in the first gap to establish a first frangible adhesive bridge spanning the first gap between the longitudinally extending side edge of the first strip and the longitudinally extending first side edge of the second strip, and joining the longitudinally extending second side edge of the second strip and the longitudinally extending side edge of the third strip together to cause the adhesive material in the second gap to establish a second frangible adhesive bridge spanning the second gap between the longitudinally extending second side edge of the second strip and the longitudinally extending side edge of the third strip to produce a frangible fiberglass insulation batt.

24. The method of claim 23, wherein the fiberglass insulation blanket has a major surface defining a width of the fiberglass insulation blanket and a lateral surface defining a thickness of the fiberglass insulation blanket that is less than the width and, during the passing step, the first cutter cuts the fiberglass insulation blanket along the first cut line to product a first cut that extends perpendicular to the major surface of the fiberglass insulation blanket and the second cutter cuts the fiberglass insulation blanket along the second cut line to produce a second cut that lies generally in spaced-apart parallel relation to the first cut and extends perpendicular to the major surface of the fiberglass insulation blanket.

* * * * *